United States Patent

[11] 3,566,234

[72] Inventor George W. Thomson
Sunnyvale, Calif.
[21] Appl. No. 774,101
[22] Filed Nov. 7, 1968
[45] Patented Feb. 23, 1971
[73] Assignee Cutler-Hammer, Incorporated
Milwaukee, Wis.

[54] CONCURRENT SAME-FREQUENCY FM RADIO REPEATER
5 Claims, 2 Drawing Figs.

[52] U.S. Cl. .......... 325/7, 325/8, 343/6.8
[51] Int. Cl. .......... H04b 7/14, H04b 3/36
[50] Field of Search .......... 325/7, 8; 343/6.8, 17.5

[56] References Cited
UNITED STATES PATENTS
3,117,277 1/1964 Magondeaux .......... 325/6
3,460,040 8/1969 Jacob .......... 325/6

*Primary Examiner*—Richard Murray
*Assistant Examiner*—Kenneth W. Weinstein
*Attorney*—Henry Huff

ABSTRACT: A common antenna, used for simultaneous reception and transmission, is coupled in single-port fashion to an oscillator that tends to synchronize itself with relatively weak signals of external origin. The frequency of the oscillator is captured by, and follows variations in, the frequency of an FM signal received by the antenna. The output of the oscillator is radiated by the antenna as an amplified replica of the received FM signal.

Figure 1:
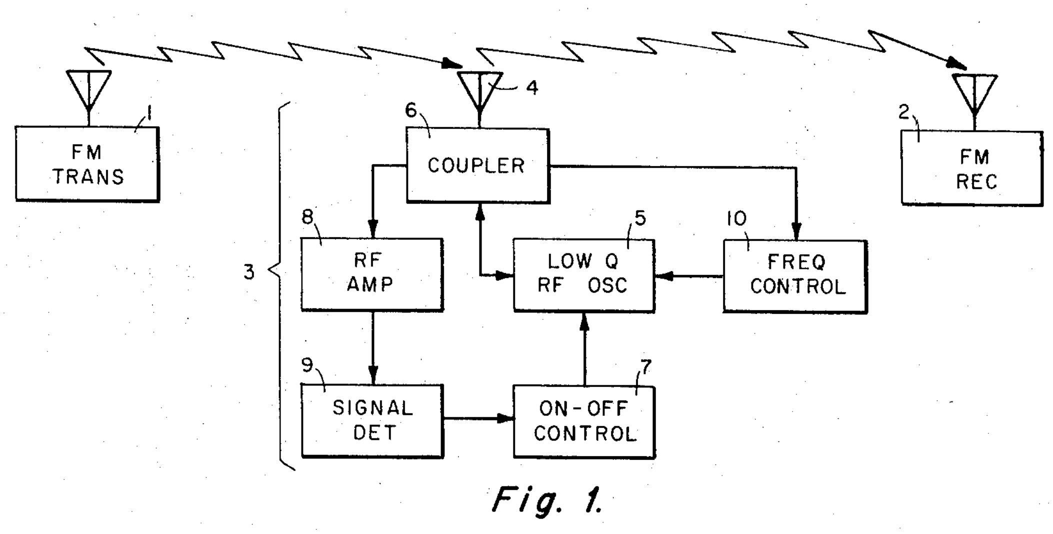

INVENTOR.
GEORGE W. THOMSON

BY Henry Huff
ATTORNEY.

CONCURRENT SAME-FREQUENCY FM RADIO REPEATER

BACKGROUND OF THE INVENTION

1. Field of the Invention

The invention pertains to FM radio repeaters, which are systems for receiving weak FM radio signals that have been attenuated by propagation loss, physical obstructions or the like, and simultaneously transmitting similar signals carrying the same modulation at a substantially higher power level.

2. Description of the Prior Art

Prior art radio repeaters generally consist of a receiver, a transmitter, and some form of signal processing means to prevent the receiver from responding to the output of the transmitter. The signal processing means may be a frequency converter which simply offsets the frequencies of the received signals outside the response band of the receiver; the frequency-offset signals are transmitted concurrently with the reception of the received signals, and with the same modulation, but on a different frequency channel. This arrangement requires the allocation of two distinct frequency channels to each repeater.

Another type of signal processing involves the use of a switching device for time sharing, or sampling, with the receiver and transmitter alternatively operative during different periods of time. This technique, although nominally requiring only a single channel, tends to spread the spectrum of the repeated signal because the switching speed must be high, causing interference on adjacent channels.

The phenomenon of synchronization of an oscillator with an external signal of a frequency near the free-running frequency of the oscillator is well known. Its application to the amplification of frequency modulated signals was discussed in a paper entitled Injection Locked Oscillators as Amplifiers for Angle Modulated Signals, given by H. L. Stover and R. C. Shaw at an IEEE Symposium at Palo Alto, Calif. in May, 1966. In this paper an injection locked oscillator is defined as any oscillator that will lock to and track in frequency an external driving signal whose amplitude is considerably less than the oscillator output amplitude. This paper was concerned with signal frequencies very near the oscillator free-running frequency, and with the device operated in a two-part mode (separate input and output) by means of nonreciprocal isolators.

SUMMARY

According to this invention, the repeater functions of reception, amplification and transmission are all performed by a low Q oscillator, designed to maximize its tendency to synchronize with external signals and provide output at an approximately constant power level independently of frequency throughout an operating frequency band. No signal processing is required to separate the signals received at the antenna from those radiated by the antenna, because the repeater simply maintains the amplitude of the RF field at the antenna approximately constant, with its frequency controlled by and identical with that of the received signal. The gain of the repeater varies inversely as the strength of the received signal because the strength of the radiated signal is nearly constant, and independent of that of the received signal being repeated.

The repeater also exhibits an acquisition facility; a received signal anywhere within the operating frequency band and above a minimum or threshold power level will synchronize the repeater. If more than one signal is received at a time, one will prevail and the others will be locked out.

Other objects of the invention are to provide: automatic turnon and turnoff of the repeater in the presence and absence of received signals, limitation of the operating frequency range to a desired channel or group of channels, and automatic control of the free-running frequency of the oscillator to maintain optimum response within the desired frequency range.

Drawing

Figure 2:
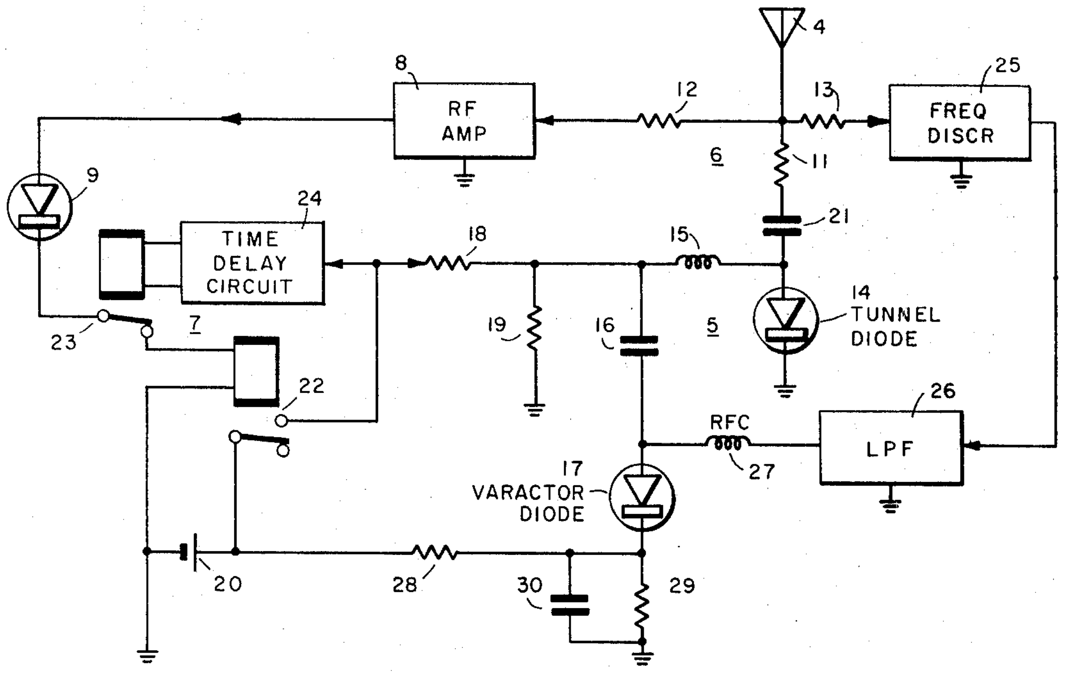

FIG. 1 is a block diagram illustrating a simple complete relay chain, with a repeater embodying this invention located between an originating FM transmitter and a final receiver, and FIG. 2 is a more detailed diagram, partly in schematic circuit form and partly in block form, of the repeater of FIG. 1.

Description

Referring to FIG. 1, it is assumed that an FM signal transmitted by a transmitter 1 is intended to be received by a receiver 2, but will not arrive there unaided with sufficient strength for satisfactory utilization. Accordingly, a repeater 3 is placed at a relay station, usually at some location between the transmitter and the reciever, where the signal from the transmitter 1 is of usable strength and the repeated signal will arrive at the receiver 2 with usable strength. In some situations a serial chain of repeaters will be required; in others, a more or less complex mesh of concurrent same-frequency repeaters may be desirable.

The repeater 3 consists essentially of an antenna 4, an oscillator 5, and a coupler 6 interconnecting them. The antenna is preferably bidirectional if the repeater is to be used between two fixed stations, and omnidirectional if service is to be provided for one or more mobile terminals. The coupler 6 is a passive network, that is, it does not include any nonreciprocal device such as a circulator or an isolator. Its purpose is to provide suitable matching between the antenna 4 and the oscillator 5, and, in the illustrated system, to conduct a small part of the power in the antenna circuit to the on-off and frequency control means.

The frequency determining means of the oscillator 5, which may include the antenna 4 in addition to a tank circuit or other resonator, is dissipatively loaded substantially as heavily as is possible without preventing self-sustained oscillation of useful amplitude. Part of the dissipative loading is provided by loss and radiation resistance of the antenna. The remainder is made up of resistive losses in the coupler 6 and in the oscillator circuit itself, augmented if necessary by inclusion of discrete resistor elements.

In the absence of any disturbing RF signals, the oscillator 5 will operate continuously as long as it is suitably energized, at its free-running frequency $f_o$, set by its frequency determining means. The heavy dissipative loading causes the frequency determining means to have a correspondingly low Q, with the following effects:

a. A relatively weak RF signal received by the antenna 4 of any frequency $f_c$ within a relatively broad band extending above and below the free-running frequency $f_0$, will produce an appreciable RF voltage across the terminals of the oscillator 5.

b. The frequency determining means exerts only a weak stabilizing effect on the oscillator frequency; accordingly, the oscillator easily synchronizes with a received signal and oscillates at the frequency $f_c$ of that signal instead of its free-running frequency $f_o$.

c. The power output level of the oscillator is approximately independent of variation of its actual frequency of oscillation throughout a broad band.

Owing to the above effects, the oscillator 5 will synchronize itself with an RF signal received by the antenna 4, providing the received signal is above a certain threshold strength and is of a frequency within a certain band, centered at the free-running frequency $f_o$. The threshold level varies inversely as the difference between the frequencies $f_c$ and $f_o$. In practice, it may be as much as 70 *db* below the oscillator output level when $f_c$ and $f_o$ are nearly equal, and 35 *db* when $f_c$ differs from $f_o$ by the width of several FM communication channel allocations.

Synchronization occurs practically instantaneously and is retained notwithstanding rapid variations in the frequency of the received signal. If the received signal is frequency modulated, the oscillator output is identically frequency modulated. Since the received signal may be, say 65 *db* below the oscillator power output level, the FM signal radiated by the antenna 4 is an amplified concurrent replica of the received signal.

When two or more signals of substantially different frequencies are received simultaneously, the one that most exceeds the threshold strength associated with its respective frequency will take control. When the frequencies are nearly the same, or correspond to nearly the same threshold, the oscillator will follow the modulation of the strongest received signal.

In some applications it is desirable to prevent transmission from the repeater except when a useful signal is being received. For this purpose, an on-off control 7 is connected to the oscillator 5. The control 7 includes a switching device and a timing device for actuating the switching device to disable the oscillator after a predetermined interval of operation, for example 10 seconds. To initiate operation when a signal is received, the switching device is actuated to enable the oscillator, in response to output from a simple radio receiver coupled to the antenna 4.

As illustrated in FIG. 1, the receiver comprises an RF amplifier 8 and a signal detector 9. The detector 9 may be simply a diode rectifier. The amplifier 8 is preferably designed with a pass band conforming to the band over which the repeater is intended to operate, in order to prevent turnon in response to unusually strong signals outside said band.

The inherent frequency stability of the oscillator 5 may be insufficient to prevent its free-running frequency $f_o$ from drifting undesirably far from the center of the intended operating frequency band. Slow variation in $f_o$ may be caused, for example, by changes in DC supply voltage with discharge of a battery, or by changes in ambient temperature. In the illustrated system, such variations are minimized by a frequency control 10, which receive small part of the RF signal present in the antenna 4 by way of the coupler 6, and compares it with a frequency reference to provide an error signal. The error signal controls a frequency determining element of the oscillator 5 in a weak and relatively sluggish manner, tending to drive the oscillator frequency toward the desired value of $f_o$ without forcing it out of synchronism with a signal being repeated.

The frequency control 10 may include a stable RF source of the desired frequency, and means for comparing its frequency and that of the oscillator, or may be simply a frequency discriminator circuit designed to provide null output at the reference frequency. In either case, the error signal is integrated or delayed, for example by means of a low pass filter, to provide the required sluggishness of control.

Referring to FIG. 2, the coupler 6 comprises resistors 11, 12 and 13 connected at a common junction point to the antenna 4. The oscillator 5 includes a tunnel diode 14, and an inductor 15, capacitor 16 and a varactor diode 17 connected in series with each other across the tunnel diode 14. When an appropriate DC bias is applied to the tunnel diode, it acts as a negative resistance, tending to oscillate at a frequency determined by the inductor 15 and the net capacitance of the series combination of the capacitor 16 and the varactor 17. A capacitor 21 blocks the DC bias from the coupler 6.

The required bias is typically a fraction of 1 volt, substantially less than the voltage of any usual source such as a battery. Resistors 18 and 19 are arranged to form a voltage divider adapted to be connected to a battery 20 and supply the desired low voltage bias to the tunnel diode, through the inductor 15.

In an ordinary tunnel diode oscillator, the voltage divider 18, 19 would be isolated from the RF portion of the circuit by means of an RF choke, for example. In this case, the resistor 19 is directly shunted across the capacitive elements 16 and 17 of the frequency determining circuit. Preferably the resistance of resistor 19 is such that its dissipative loading, together with that provided by the antenna 4 and the coupler 6 and any other circuit losses, provides a total effective positive resistance which is only slightly less than the negative resistance of the tunnel diode. If necessary, the loading may be increased by adding a resistor to the inductor 15, for example, or decreased by providing some isolation between the voltage divider and the frequency determining circuit.

The on-off control 7 comprises a normally open relay 22, a normally closed relay 23, and a time delay circuit 24. The circuit 24 may be of the type shown and described on page 230 of the Transistor Manual, published in 1964 by the Semiconductor Products Department of the General Electric Company, Electronics Park, Syracuse, N.Y.

When the relay 22 is in its normally open condition as shown, the battery 20 is disconnected from the oscillator 5 and no signal is radiated from the antenna 4. When a signal of usable strength and of a frequency within the pass band of the RF amplifier 8 is received, current flows through the detector 9, the normally closed contacts of relay 23, and the actuating coil of relay 22. Relay 22 closes, energizing the oscillator and also the time delay circuit 24.

The repeater operates as described above during an interval determined by the time delay circuit 24. If the received signal ceases during this interval, the oscillator 5 will revert to its free-running frequency. Its output will be detected by detector 9, keeping relay 22 closed.

At the end of the interval, relay 23 is actuated to open, deenergizing relay 22 which also opens. Opening of relay 22 disconnects the battery from the oscillator 5 and the time delay circuit 24. The oscillator stops, and relay 23 is deenergized and recloses. If a received signal is still present, relay 22 is reclosed immediately and another interval of operation is initiated. Thus the repeater briefly interrupts operation at the end of each interval to check reception of a signal to be repeated. If one is present, it resumes operation. If not, it remains off until another signal is received.

The frequency control 10 includes a frequency discriminator 25, a low pass filter 26, and the varactor 17. The discriminator is designed to operate over substantially the same band as the RF amplifier 8, encompassing several FM communication channels for example, with its null point at the desired free-running frequency $f_o$. The low pass filer 26 is designed to cut off at a frequency substantially lower than the lowest modulation frequency of a signal to be repeated, sat at 5 cycles per second. A radio frequency choke 27 provides RF isolation between the oscillator circuit and the low pass filter.

Resistors 28 and 29 are connected across the battery 20 to form a voltage divider for biasing the varactor 17 to an intermediate point in its range of capacitance variation, where, in combination with capacitor 16, it tunes the inductor 15 nominally to $f_o$. Resistor 29 is shunted by a bypass capacitor 30 which may be omitted if part of the dissipative loading of the oscillator circuit is to be contributed by the resistor 29.

When the frequency is actually $f_o$, the discriminator 25 provides zero output and no additional bias is applied to the varactor. When the actual frequency is above or below $f_o$, the discriminator provides DC output of such polarity as to increase or decrease the capacitance of the varactor. The sensitivity of the discriminator is made low enough to prevent the oscillator from being driven out of synchronism with a signal being repeated, and the low pass filter prevents the modulation of the repeated signal from affecting the varactor.

After an idle period, when the oscillator is turned on in response to a received signal, the oscillator may start at a frequency undesirably far from $f_o$. The discriminator will respond to the stronger oscillator output instead of the weaker received signal, and tune the oscillator toward $f_o$ until it locks on the received signal. Ordinarily this operation will occur with a fraction of a second, preventing loss of more than a small initial portion of the signal to be repeated.

I claim:

1. A same-frequency nontime-sharing repeater for receiving, amplifying and retransmitting frequency modulated radio signals, comprising an antenna, an injection locked oscillator and means coupling said oscillator to said antenna for causing the operating frequency of said oscillator to instantaneously follow variations in frequency of said radio signals received by said antenna, said oscillator including means that determines the freenrunning frequency of the oscillator, means dissipatively loading said frequency determining means for providing said oscillator with the minimum loaded Q permitting self-sustained oscillation of the oscillator, and reradiating means including said antenna for reradiating an amplified replica of said received signals produced by said oscillator.

2. The invention set forth in claim 1, wherein said oscillator comprises a two terminal negative resistance device and said frequency determining means is a resonator that includes said antenna as an inductive element thereof.

3. The invention set forth in claim 1, further including means for detecting the presence at said antenna of a signal exceeding a predetermined amplitude level, a timing device, means responsive to said signal detecting means to start said timing device and initiate operation of said oscillator, and means operable by said timing device to stop operation of said oscillator.

4. The invention set forth in claim 3, wherein said signal detecting means includes a band pass filter device to prevent the initiation of operation of said oscillator in response to received signals of frequencies outside a predetermined frequency band.

5. The invention set forth in claim 1, further including a frequency reference device, means for comparing the frequency of said oscillator with that of said said reference device to produce an error signal, frequency control means responsive to said error signal to reduce the difference between the frequency of said oscillator and that of said frequency reference device, and means including a low pass filter for applying said error signal to said frequency control means, said low pass filter having a cutoff frequency lower than the lowest frequency modulation component of any signal to be repeated.